United States Patent [19]
Sanders et al.

[11] 3,754,482
[45] Aug. 28, 1973

[54] METHOD AND APPARATUS FOR CONTROLLING TORQUE CAPACITY IN TORQUE TRANSMITTING DEVICES

[75] Inventors: Robert K. Sanders, Whitestown; Jerry R. Marlow, Greenwood; Kenneth A. Dornfeld; Robert E. Nelson, both of Indianapolis, all of Ind.

[73] Assignee: General Motors Corporation, Detroit, Mich.

[22] Filed: May 28, 1971

[21] Appl. No.: 147,969

[52] U.S. Cl............................ 74/752 A, 74/752 D
[51] Int. Cl............................................... F16h 3/74
[58] Field of Search...................... 74/752 A, 752 D, 74/866; 192/103 C, 109 F, 0.077, 87.18, 87.19

[56] References Cited
UNITED STATES PATENTS

| | | | |
|---|---|---|---|
| 2,739,679 | 3/1956 | Randol................................. | 192/54 |
| 3,389,770 | 6/1968 | Golan............................. | 192/109 F |
| 3,527,328 | 9/1970 | Maurice........................... | 192/87.19 |
| 3,618,424 | 11/1971 | Golan............................. | 192/109 F |

FOREIGN PATENTS OR APPLICATIONS

1,912,276   10/1969   Germany......................... 192/87.18

*Primary Examiner*—Carlton R. Croyle
*Assistant Examiner*—John F. Winburn
*Attorney*—Jean L. Carpenter, Paul Fitzpatrick and Warren D. Hill

[57] ABSTRACT

In a power transmission wherein a ratio change is accomplished by engaging one clutch or brake and disengaging another, a smooth shift is effected by modulating the torque capacities of the clutches or brakes during the shift as a function of transmission input speed. Pressure responsive clutches and brakes are controlled by solenoid valves which produce pressures proportional to solenoid current. An electronic control computes the desired pressures according to variation of input speed. A plurality of shift valves each have a differential area portion responsive to engagement pressure to control the engagement of a clutch or brake and a control chamber responsive to the variable control pressure.

13 Claims, 12 Drawing Figures

INVENTORS
Robert K. Sanders,
Jerry R. Marlow,
Kenneth A. Dornfeld &
Robert E. Nelson
BY Warren D. Hill
ATTORNEY

METHOD AND APPARATUS FOR CONTROLLING TORQUE CAPACITY IN TORQUE TRANSMITTING DEVICES

This invention relates to controls for engageable torque transmitting devices and particularly those for smoothly establishing drive between drive and driven members.

In multi-ratio power transmissions, for example, those in automotive vehicles, it is desirable to smoothly shift ratios so that the vehicle occupants are not subjected to uncomfortable jerks and so that the transmission components are not subjected to excessive forces. Stated in another way, it is desired to avoid sudden or extreme torque fluctuations in the transmission output. On the other hand, a ratio shift must be made rapidly to achieve a good vehicle performance and to prevent extended clutch or brake slippage within the transmission.

It has been proposed in the U.S. Pat. to Wilson et al. No. 2,995,957 to control the rate of engagement of a torque transmitting device according to the rate of engine deceleration to effect a smooth shift. The present invention, however, provides a highly refined system for accomplishing the same purposes and which is effective for downshifts as well. In addition, this invention provides a control for two torque transmitting devices simultaneously rather than a single device.

It is therefore a general object of this invention to provide an improved control for a torque transmitting device wherein the torque capacity of the device is varied as a function of speed changes of the driving member to provide a smooth engagement or disengagement.

It is another object to provide a method and apparatus for simultaneously modulating the torque capacities of an engaging and disengaging torque transmitting device to achieve a smooth ratio change.

It is yet another object of the invention to provide a method and apparatus for obtaining smooth downshifts as well as upshifts in a transmission by controlling simultaneously an engageable and disengageable torque transmitting device as a function of variations of input speed.

It is still another object of the invention to provide an electronic control sensitive to speed of a driving member to modulate clutch and brake pressures to smoothly effect upshifts and downshifts in a transmission.

The invention is carried out by providing a control responsive to the speed of a driving member to establish a desired acceleration thereof including apparatus for modulating the torque capacity of a torque transmitting device to achieve the desired acceleration and including a fast response apparatus for approximating the torque capacity required to achieve the desired acceleration and another apparatus to accurately regulate the acceleration of the driving member. The invention further comprehends apparatus for simultaneously controlling the pressure on pressure responsive clutches and brakes for establishing an acceleration of the driving member or the driven member of a transmission according to a programmed acceleration.

The invention is also carried out by a method of controlling a ratio change in a transmission having a driving member and a pair of selectively engageable torque transmitting devices having variable torque capacities by establishing a program of desired acceleration of the driving member and varying the torque capacities of the engaging and disengaging devices according to acceleration of the driving member to thereby control the actual acceleration of the driving member according to the desired program.

The above and other advantages will be made more apparent from the following specification taken in conjunction with the accompanying drawings wherein like reference numerals refer to like parts and wherein.

Figure 1:
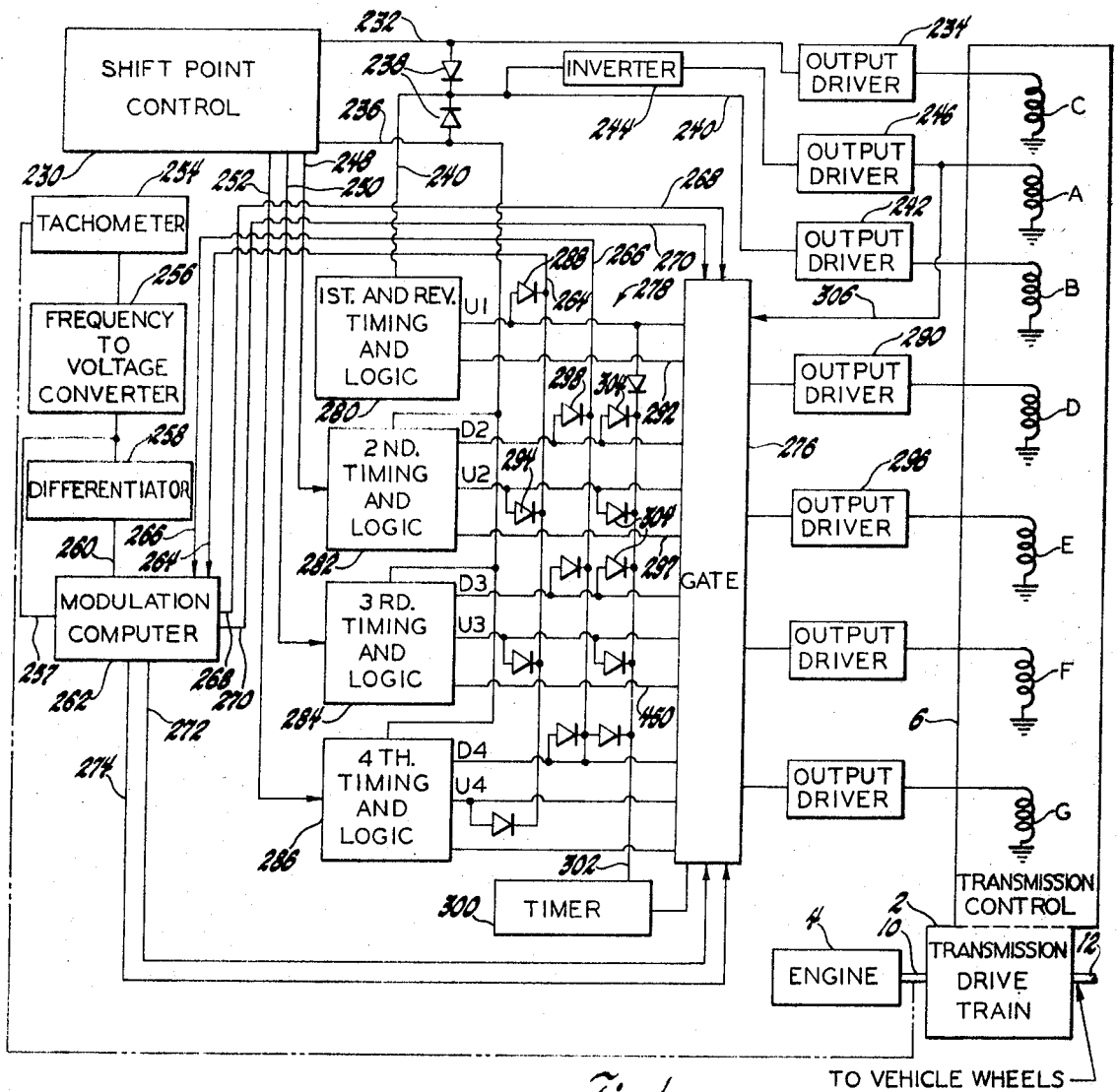
FIG. 1 is a combined schematic and diagrammatic illustration of a transmission control according to the invention.
Figure 6A:
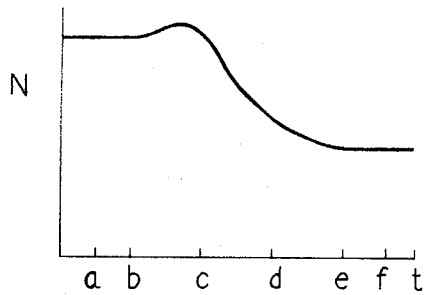
Figure 8:
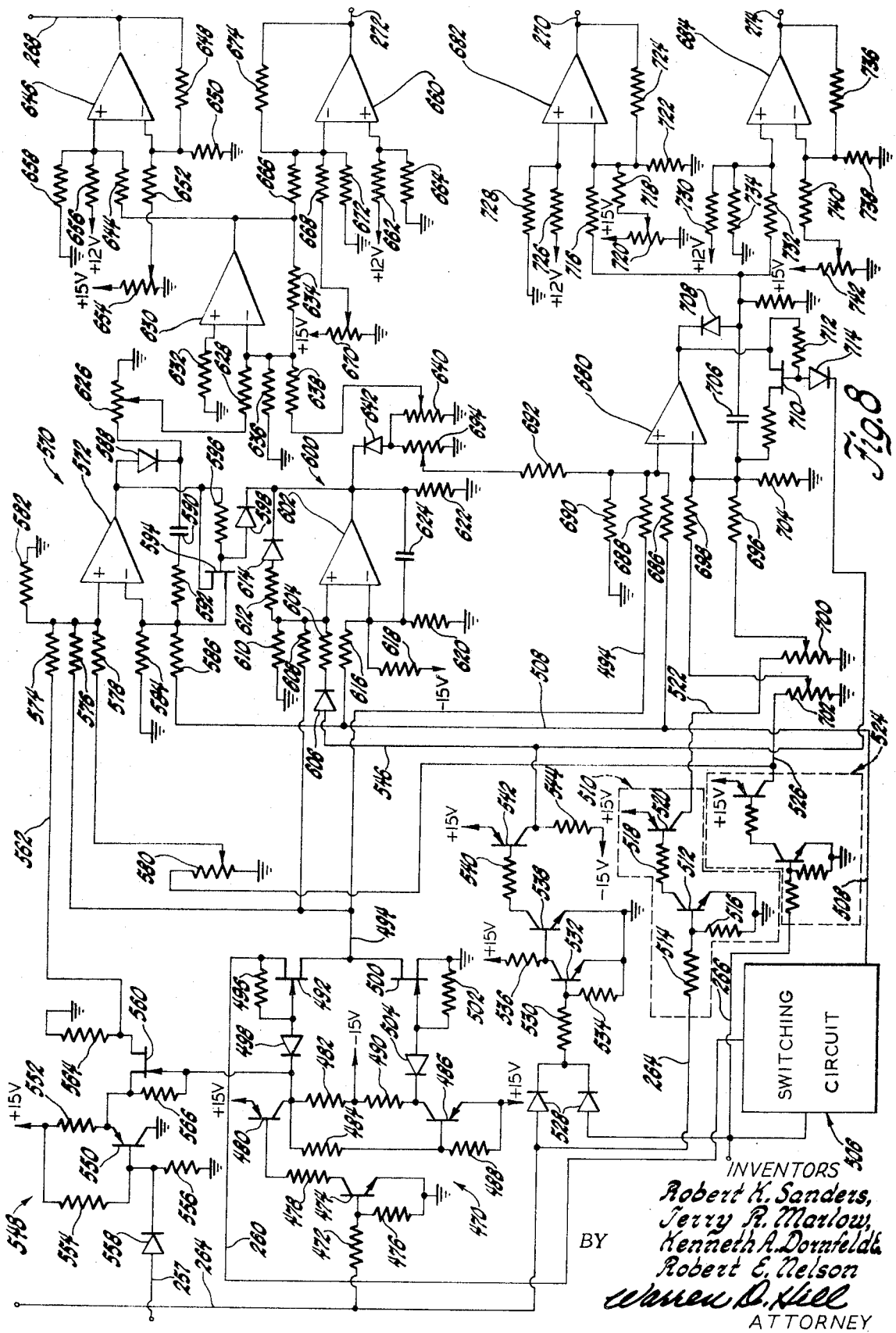

FIGS. 6a,b and c and 7a, b and c are graphical illustrations of input speed and modulated pressures for upshift and downshift respectively; and, FIG. 8 is a schematic illustration of the modulation computer of FIG. 1.

FIG. 1 illustrates a transmission drive train 2, driven by an engine 4 through a transmission input shaft 10. The drive train 2 is provided with an output shaft 12 for driving the wheels of a vehicle. A hydraulic control circuit 6 controls the operation of the drive train and in turn is controlled by an electronic circuit for selectively energizing solenoids A – G to position the valves of the control 6 in a manner to be described. The details of the drive train 2 and the control 6 are shown in FIGS. 2 and 3 respectively.

THE DRIVE TRAIN

Figure 2:
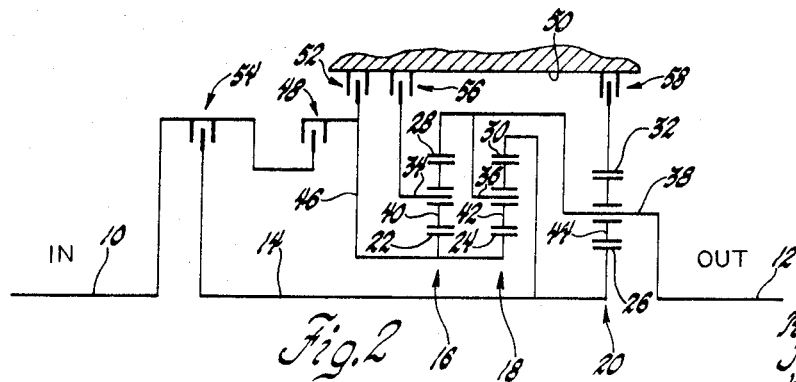
FIG. 2 is a schematic drawing of a planetary gearing arrangement incorporated in FIG. 1.
Figure 3:
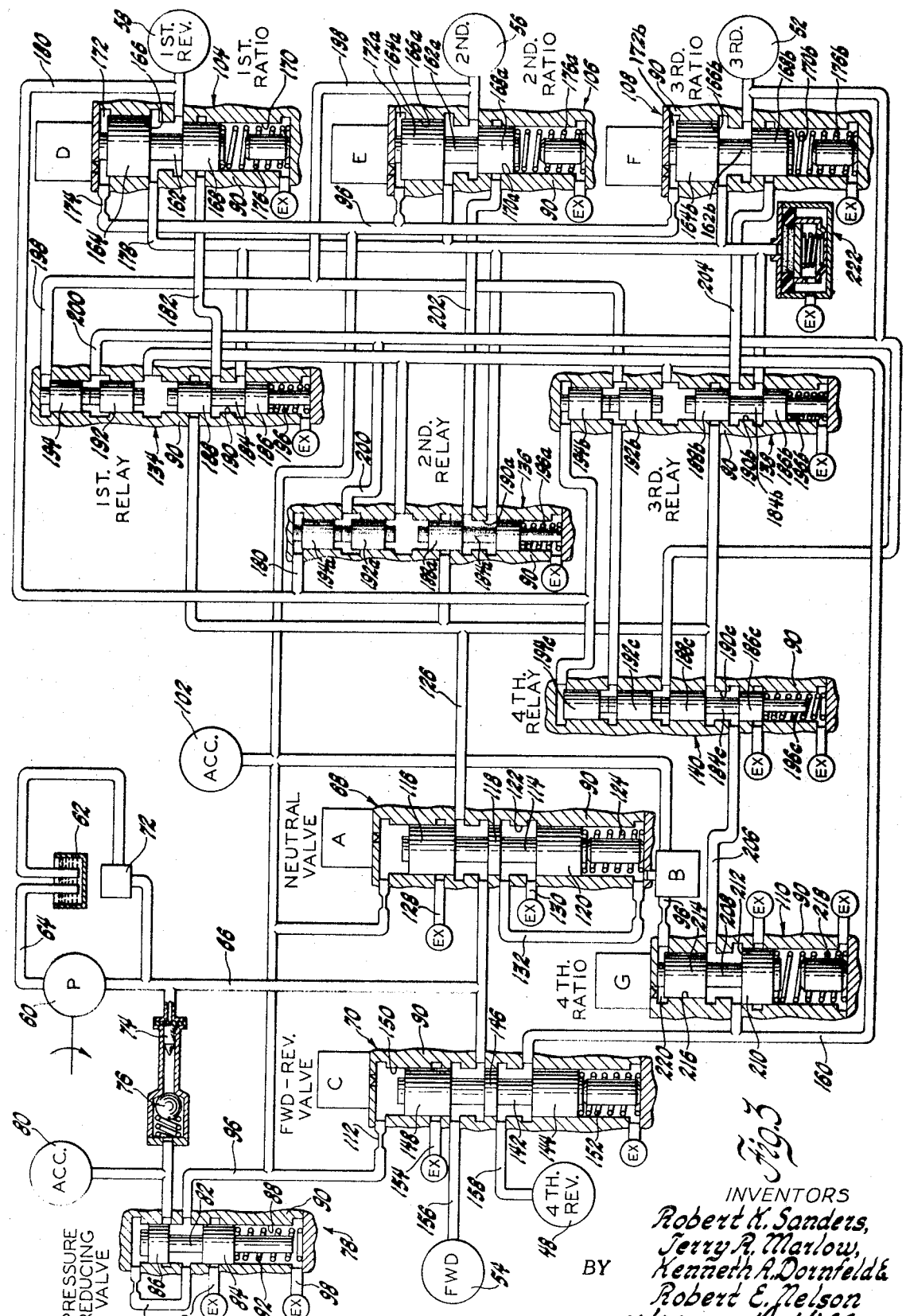
FIG. 3 is a diagrammatic view of a control system for controlling gear ratios in the gear system shown in FIG. 2.

There is shown in FIG. 2 a gearing schematic having the input shaft 10, the output shaft 12, an intermediate shaft 14 and three planetary gear sets generally designated 16, 18 and 20. Each of the planetary gear sets 16, 18 and 20 have sun gears 22, 24 and 26 respectively, ring gears 28, 30 and 32 respectively, carriers 34, 36 and 38 respectively and planet gears 40, 42 and 44 meshing with their respective sun and ring gears. The sun gears 22 and 24 are selectively connectable through hub 46 with the input shaft 10 through a clutch 48 and with the transmission housing 50 through a brake 52. The ring gear 30 and the sun gear 26 are drivingly connected to the intermediate shaft 14 which is selectively connectable to the input shaft 10 through a clutch 54. The carrier 34 and ring gear 32 are selectively connectable with the transmission housing through friction brakes 56 and 58 respectively. The ring gear 28, carrier 36 and carrier 38 are drivingly connected with the output shaft 12. Through selective engagement of various combinations of the clutches and brakes, four forward speeds and one reverse speed may be obtained between the input shaft 10 and the output shaft 12. The clutch 54 is engaged for all forward drives and the brakes 58, 56 and 52 and clutch 48 are selectively engaged for drive ratios 1 through 4 in the forward direction. For reverse drive the clutch 48 and the brake 58 are engaged. A more complete description of the operation of this gearing arrangement may be found in the patent application of O'Malley U.S. Ser. No. 805,190 filed Mar. 7, 1969. The clutches and brakes of this transmission are conventional disc type friction torque transmitting devices having hydraulically operated fluid motors which may be selectively actuated to provide for engagement and disengagement. A hydraulic control system for controlling the clutches and brakes is shown in FIG. 3.

THE HYDRAULIC CONTROL

The hydraulic control system includes an engine driven pump 60 which draws fluid from a reservoir 62 through an intake passage 64 and delivers fluid to a main pressure passage 66 which is connected to a neutral valve 68 and a forward reverse valve 70. The pressure in main passage 66 is controlled by a conventional pressure regulator valve 72. The main passage 66 is also connected through a filter 74 and a ball check valve 76 to a pressure reducing valve 78. An accumulator 80 is connected between the ball check valve 76 and the pressure reducing valve 78 to maintain a pressure charge on the pressure reducing valve 78 in the event that the pressure in the main pressure passage 66 should fluctuate below the setting of the regulator valve 72, such as during the engagement of the clutches and brakes.

The pressure reducing valve 78 includes a valve spool 82 having equal diameter spaced lands 84 and 86 slidably disposed in a valve bore 88 which is located in a valve body 90. Compression spring 92 is compressed between valve land 84 and one end of bore 88 thereby placing a spring bias force on the valve spool 82. In the spring set position, main pressure from passage 66 is delivered between lands 84 and 86 to a pressure bias passage 94 which directs fluid pressure to the end of valve spool 82. Pressure on the end of valve spool 82 moves the valve spool against spring 92 so that when a predetermined pressure is present in passage 94 the land 86 will close off the main pressure from passage 66. This pressure is designed to be less than main pressure and is distributed from the area between lands 84 and 86 to a solenoid pressure passage 96. The valve 78 has two exhaust passages 98 and 100 which prevent fluid pressure build up in the area of spring 92 and relieve excessive pressure between lands 84 and 86 respectively. The passage 96 is connected with an accumulator 102, the forward-reverse valve 70, the neutral valve 68, a first ratio shift valve 104, a second ratio shift valve 106, a third ratio shift valve 108, and a fourth ratio shift valve 110. This pressure passage supplies fluid to solenoid chambers on each of the valves to which it is connected and has a plurality of restrictions such as restriction 112 at valve 70 to prevent excessive fluid flow through the solenoid chamber of the valves when the solenoid valves are open.

The neutral valve 68 has a valve spool 114 having three equal diameter spaced lands 116, 118 and 120 slidably disposed in a valve bore 122 in the valve body 90. A compression spring 124 is compressed between one end of the valve bore 122 and valve land 120 to urge the valve spool 114 upward in valve bore 122 to the neutral position. The upper end of valve bore 122 is connected to a solenoid valve A and the lower end of the valve bore 122 is connected to a solenoid valve B. These solenoid valves A and B open and close in response to electrical signals to permit the ends of the valve spool 114 to be selectively pressurized or exhausted. The bore 122 is connected with the main passage 66 and engagement passage 126, a pair of exhaust passages 128, 130 and a neutral passage 132. In the neutral position the passage 66 is connected between lands 118 and 120 with the neutral passage 132 which directs fluid via an orifice to the lower end of valve spool 114 to assist the spring 124 in holding the valve spool 114 in the neutral position. In the neutral position the exhaust passage 130 is closed by valve land 120 while the exhaust passage 128 is opened between lands 116 and 118 with engagement passage 126. In the automatic position, that is when the solenoid valve B is open and solenoid valve A is closed, the spring chamber is exhausted through solenoid valve B while the upper end of valve spool 114 is pressurized due to the closing of solenoid valve A so that the pressure on valve land 116 urges the valve spool 114 downward against the spring 124 thereby connecting passage 66 with passage 126 to supply main pressure to the passage 126. The passage 126 is connected to the first, second, third and fourth relay valves 134, 136 and 138 and 140 respectively.

The forward-reverse valve 70 includes a valve spool 142 having three equal diameter spaced lands 144, 146 and 148 slidably disposed in a valve bore 150 in the valve bore 90, a compression spring 152 is compressed between one end of valve bore 150 and valve land 144 and a solenoid valve C which controls fluid pressure in the valve bore 150 is positioned adjacent the end of valve land 148. The valve bore 150 is connected with the main passage 66, the solenoid passage 96, an exhaust passage 154, a forward clutch passage 156 and a reverse clutch passage 158. In the forward position solenoid valve C is closed so that fluid pressure from passage 96 acts on the end of valve land 148 to urge the valve spool 142 downward against spring 152 to provide fluid communication between main passage 66 and forward passage 156 to permit engagement of forward clutch 54. Also in this position, a passage 158 is in fluid communication between lands 144 and 146 with a fourth ratio engagement passage 160. In the reverse position the solenoid valve C is opened thereby exhausting the upper end of valve bore 150 to permit the spring 152 to move th valve spool 142 upward thereby connecting the forward clutch 54 to exhaust passage 154 between lands 146 and 148 and to connect main passage 66 to the direct reverse clutch 48 between lands 144 and 146. Also in the reverse position the passage 160 is blocked by valve land 144.

The first ratio shift valve 104 includes a valve spool 162 having a large diameter land 164 slidably disposed in valve bore 166 and a small diameter land 168 slidably disposed in valve bore 170, a solenoid valve D controls fluid pressure in valve bore 166 adjacent the upper end of valve land 164. The valve land 164 and the valve bore 166 cooperate to form a control chamber 172 which is supplied with fluid pressure through a restriction 174 from the solenoid passage 96. The valve spool 162 is urged upward by a compression spring 176. The valve bore 166 is in fluid communication with an exhaust passage 178 and a first ratio engage passage 180 which is connected to the first ratio brake 58 and to the second, third and fourth relay valves 136, 138 and 140 respectively. The valve bore 170 is in fluid communication with a first ratio feed passage 182 which is connected with the first relay valve 134. A solenoid valve D is a variable force solenoid valve such as that shown in the U.S. Pat. No. 3,225,619 to R. H. Schaeffer, issued Dec. 28, 1965. The variable force solenoid valve functions such that as the current applied to the solenoid increases the output force of the solenoid valve increases so that the solenoid valve progressively moves toward closed position with increasing current. Thus, the current applied to the solenoid valve D controls the exhaust opening for chamber 172 so that as the solenoid valve closes pressure develops in chamber 172 to cause the valve spool to move downward against the spring 176 thereby tending to disconnect exhaust passage 178 from passage 180 while tending to connect passage 182 to passage 180. If pressure is available in passage 182 it will be delivered to brake 58 in an amount generally proportional to solenoid current and will also react on the differential area between lands 164 and 168. The pressure acting on the differential area between lands 164 and 168 assists the spring 176 to cause the valve spool 162 to be positioned in a steady state condition. As the solenoid valve force continues to increase, the pressure acting on the differential area will also increase thereby controlling the engagement pressure of brake 58 proportional to the solenoid current. When the solenoid valve D is fully closed, the pressure acting on the differential area and the spring force are not sufficient to overcome the pressure force on land 164 so that the valve 104 will be held downward against the spring 176 in the shifted position.

The first relay valve 134 includes a valve spool 184 having equal diameter spaced lands 186 and 188 slidably disposed in a valve bore 190, a pair of plug valves 192 and 194 slidably disposed in valve bore 190 and a compression spring 196 compressed between valve land 186 and one end of valve bore 190. The valve bore 190 is connected to the engagement passage 126, the exhaust passage 178, the first ratio feed passage 182, the fourth ratio engage passage 160, a second ratio engage passage 198 and a third ratio engage passage 200. In the spring set or first ratio position the passage 126 is in fluid communication between lands 186 and 188 with the first ratio feed passage 182 and the exhaust passage 178 is closed by land 186. When the transmission is operating in the second ratio, pressure in passage 198 will move the plug valves 194,192 and valve spool 184 downward against spring 196 thereby connecting first ratio feed passage 182 to exhaust passage 178 and also causing valve land 188 to block passage 126. When the transmission is operating in the third ratio, pressure in passage 200 will move plug valve 192 and valve spool 184 downward against spring 196 against exhausting first ratio feed passage 182. When the transmission is operating in fourth ratio, pressure in passage 160 will move the valve spool 184 downward against the spring 196 again exhausting first ratio feed passage 182.

The second ratio shift valve 106 is identical in construction with the first ratio shift valve 104 and the corresponding components have been given the same numerical designation with an *a* suffix. The valve bore 166a is in fluid communication with the exhaust passage 178 and the second ratio engagement passage 198. The bore 170a is in fluid communication with a second ratio feed passage 202. The second ratio shift valve 106 operates in the same manner as the first ratio shift valve 104 such that as the current supplied to solenoid valve E is increased during an upshift from first ratio or a downshift from third ratio, the fluid pressure to the second ratio brake 56 is controlled by the current supplied to the solenoid valve E and the fluid pressure acting on the differential area between lands 164a and 168a. Main pressure is supplied to the second ratio shift valve 106 by the second ratio relay valve 136. The second ratio relay valve is identical in construction to the first ratio relay valve 134 and the corresponding components have been given the same numerical designation with an *a* suffix. The second ratio relay valve is controlled or moved towards its shifted position to prevent engagement of the second ratio brake 56 whenever first, third or fourth drive ratios are engaged by fluid pressure in passage 180, 200 and 160 respectively. As an upshift is made from first to second, the pressure in passage 180 will hold the second ratio relay valve 136 in the shifted position thereby connecting second ratio feed passage 202 to the exhaust passage 178. However, as a 1-2 upshift is made, the current to solenoid D is gradually discontinued in a controlled manner thereby permitting the first ratio shift valve 104 to move to the spring set or downshifted position thereby exhausting passage 108 which will permit the second ratio relay valve 136 to move to the spring set or unshifted position to connect passage 126 with second ratio feed passage 202. Also during the 1-2 upshift the current to solenoid valve E will increase in a controlled manner thereby gradually closing the solenoid valve so that the second ratio shift valve 106 will move towards the upshifted position to permit engagement of the second ratio brake 56. As described above, for the first ratio, brake 58, the engagement pressure to the second ratio brake 56 is controlled by the current to solenoid E and the pressure bias on the differential area between lands 164a and 168a.

The third ratio shift valve 108 is identical in construction with the first and second ratio shift valves and corresponding components have been given the same numerical designation with a *b* suffix. A third ratio feed passage 204 is connected between the third ratio shift valve 108 and the third ratio relay valve 138. The third ratio shift valve 108 functions in a manner identical to that described above for the first and second ratio shift valves to control the engagement of the third brake 52 in proportion to the current supplied to solenoid valve F and the pressure bias acting on the differential area between lands 164b and 168b.

The supply of main pressure to the third ratio shift valve 108 via passage 204 is controlled by the third ratio relay valve 138 which is identical in construction to the first and second relay valves 134 and 136, previously described, and the corresponding components thereof have been given the same numerical designation with a *b* suffix. The third ratio relay valve 138 is moved to its shifted position whenever fluid pressure is present in passage 160, 198 or 180.

The fourth ratio relay valve 140 is identical to construction to the first, second and third relay valves and the corresponding components have been given the same numerical designation with a *c* suffix. The fourth ratio relay valve 140 controls main line pressure through the fourth ratio shift valve 110 via passage 206.

The fourth ratio shift valve 110 includes a valve spool 208 having a large diameter land 210 slidably disposed in valve bore 212 and a small diameter land 214 slidably disposed in valve bore 216. A compression spring 218 is compressed between valve land 210 and one end of valve bore 212 to move the valve spool 208 upward to the position shown. A control chamber 220 is located between one end of valve bore 216 and the end of valve land 214. The pressure in chamber 220 is controlled by a variable force solenoid valve G. As is readily seen, this shift valve will operate in a manner opposite to that described above for the first through third ratio shift valves. As current is increased to the solenoid valve G, the solenoid valve will be moved toward closed position thereby permitting a pressure buildup in chamber 220 which pressure will act on valve land 214 to move the valve spool 208 downward tending to exhaust a fourth ratio engage passage 160. In the spring set position shown, the valve is set to engage the fourth ratio whenever fluid pressure is available in the fourth ratio feed passage 206. To prevent the fourth ratio from engaging during a neutral-1, 1-2 or 2-3 shift, a current is applied to solenoid G so that the fourth ratio shift valve 110 will move to the shifted position thereby preventing engagement of the fourth ratio clutch 48. However, during operation in the forward drives, if solenoid valves D, E, F and G should fail to function, the transmission will be conditioned for a fourth ratio drive so that continued vehicle operation will occur. This provides a failsafe feature so that in the event that ratio change is not available, the vehicle can still be driven.

The relay valves 134, 136, 138 and 140 are designed so that pressure sufficient to engage the brakes or clutches must be present in the ratio engage passages between the relay valves will shift against the force of their respective bias springs. For example, when the transmission is operating in the first forward drive ratio with the brake 58 engaged, the pressure in passage 180, being sufficient to maintain the brake 58 engaged, will hold the second, third and fourth relay valves in their shifted position. During an upshift from first to second ratio, the pressure in passage 180 will begin to decrease. At shift initiation this pressure decreases so that the pressure in passage 180 will no longer be sufficient to hold the second, third and fourth relay valves in their shifted position. When this point is reached, the relay valves will move to their spring set position permitting pressure in passage 126 to be directed to passage 202 through the second relay valve 136. As described above, the second ratio shift valve 106 will control the rise of pressure in the second ratio engage passage 198. As the pressure increases in passage 198 to a value sufficient to overcome the spring forces of the first, third and fourth relay valves, which pressure is sufficient to maintain the brake 56 engaged, the relay valves 134, 138 and 140 will be shifted against the force of their respective springs. When the first, third and fourth relay valves are shifted, pressure supplied to the first, third and fourth shift valves will be discontinued. Thus, during a 1-2 upshift, pressure is supplied to both the first ratio brake 58 and the second ratio brake 56 so that an interruption in power flow, from the input shaft to the output shaft, does not occur during an upshift. This same sequence occurs during upshifts between the other drive ratios and also during downshifts between drive ratios.

A check valve generally designated 222 is provided in the exhaust passage 178 so that fluid pressure in exhaust passage 178 will be maintained at a minimum value. This setting is usually between a 0.5 and 0.75 psi.

THE ELECTRONIC CONTROL

Referring again to FIG. 1, there is shown the electrical control apparatus for operating the solenoid valves A – G to establish the desired gear ratios and to effect smooth shifting from one ratio to another. The control has been specifically designed for and has been used with an engine 4 of the gas turbine type, but is in principle applicable to other types of engines as well. Similarly, the control is not limited to the transmission described herein, but rather is useful, with perhaps minor modifications, in connection with any type of transmission having torque transmitting devices, i.e., clutches or brakes, having variable torque capacities and is especially suitable where shifting is accomplished by engaging one device and disengaging another.

A shift point control 230 selects the range of operation, i.e., reverse, neutral or forward, as well as the desired forward ratio, i.e., first, second, third or fourth ratio. The shift point control may be a suitably designed manually controlled electrical switching mechanism or, if desired, may be an automatic control such as that described in the U.S. Pat. to Nelson No. 3,448,640, which is incorporated herein by reference. According to FIG. 3A of that patent in particular, there is shown an apparatus for establishing electrical signals for the desired ranges and ratios. When the shift point control is used with a gas turbine engine, the gasifier speed is used as the engine operating parameter instead of throttle position. The shift point control 230 produces a DC output signal on line 232 to indicate a desired reverse range. That line is connected to an output driver 234 which in turn is connected to solenoid C to energize that solenoid when the line 232 is energized. Forward enable line 236 is energized to indicate a desired forward range. Diodes 238 connect the lines 232 and 236 to a range line 240 which energizes solenoid B through an output driver 242 and energizes the first and reverse solenoid D in the absence of a demand for another drive ratio. An inverter 244 is connected between the range line 240 and an output driver 246 to energize neutral solenoid A only when the line 240 is not energized. The forward enable line 236 is constantly energized while the transmission is in a forward drive range. Second, third or fourth gear ratios are requested by energizing lines 248, 250 and 252 respectively. Thus, when the transmission is operating in the second ratio, for example, the lines 236 and 248 are energized. To call for an upshift to the third line, the line 250 is also energized. On the other hand, to call for a downshift from the second to first ratio, the line 248 will be deenergized. The remainder of the circuitry depicted in FIG. 1 is for the purpose of the modulating current to the solenoids D – G in order to effect a smooth shift from one ratio to another when a shift is requested.

A tachometer 254 senses the speed of the driving member or input shaft 10 and is preferably an electromagnetic transducer of the well-known toothed wheel variable reluctance type which produces pulses having a frequency proportional to shaft speed, which pulses are fed to a frequency-to-voltage converter 256 to produce on line 257 a DC voltage proportional to shaft speed. The speed voltage is operated upon by differentiator 258 to produce on line 260 a signal proportional to acceleration of the input shaft 10. The term "acceleration" as used herein denotes either positive acceleration or deceleration unless otherwise specified. A modulation computer 262 has as inputs the acceleration signal on line 270, the speed signal on line 257, and upshift and downshift signals carried by lines 264, 266 respectively. On the basis of those input signals, the modulation computer produces as outputs on lines 268, 270, 272 and 274 modulation signals for the control of selected ones of the solenoids D – G. The solenoids to be energized are selected by a gate circuit 276 which is controlled through a diode matrix 278 by a first and reverse timing and logic circuit 280 and second, third and fourth timing and logic circuits 282, 284 and 286 respectively. The first and reverse timing and logic circuit 280 is energized by the range line 240 which initially produces an upshift signal on line U1 which is fed to the gate 276 and through a diode 288 to the upshift line 264. The upshift signal on line U1 conditions the modulation computer to produce output signals suitable for an upshift and conditions the gate 276 to select the appropriate solenoids for modulating engagement and disengagement. More specifically, with respect to a shift from neutral to first, it is desired to energize the solenoid D to engage the first ratio brake 58 in a modulating manner. Accordingly, the gate 276 connects the output driver 290 to the line 268 which carries the oncoming modulation signal. After the first ratio brake has had ample time to become fully engaged, say two seconds, the timing and logic circuit 280 removes the signal on line U1 and energizes line 292 which fully energizes the solenoid D in the event it has not already been fully energized to force fully application of the first ratio brake 58. During a shift from first to second ratio, the line 248 becomes energized to actiate the second timing and logic circuit 282 which produces a signal on line U2 which is fed to the gate 276 and is fed through a diode 294 to the upshift line 264. In this case, the gate 276 connects the output driver 296 to the oncoming modulation signal on line 268 to energize the solenoid E to engage the second ratio brake 56 in a modulating fashion and simultaneously the gate 276 connects the output driver 290 to the line 270 carrying the offgoing modulation signal to deenergize the solenoid D in a modulating fashion. At the end of approximately two seconds shift time, a line 297 is energized to force full energization of solenoid E and complete deenergization of solenoid D. In the event of a downshift from second to first ratio, the signal is removed from line 248 and the line D2 is energized to appropriately condition the gate 276 and to energize the downshift line 266 via a diode 298. The remaining timing and logic circuits 284 and 286 are connected in a similar manner so that upshift signals are produced on lines U3 and U4 respectively and downshift signals are produced on lines D3 and D4 respectively. The upshift signals on lines U3 and U4 are each connected to energize the upshift line 264 and similarly the downshift signals each energize the downshift line 266. Moreover, for every shift (except first to neutral and third to fourth ratios) a timer 300 is energized through a line 302 connected by diodes 304 to the several lines U1, U2, D2, etc., as shown. The timer in turn conditions the gate 276 to fully energize the solenoid G to maintain the clutch 48 released throughout the shift duration, and for an additional 0.5 seconds after shift completion. In addition, line 306 connects the output of the netural output driver 246 to the gate 276 to fully energize solenoid G to maintain the clutch 48 released when neutral range is requested. The solenoids D, E and F when energized are modulated according to the signals on lines 268 and 270. However, since the valve associated with solenoid G is opposite in operation to the other ratio valves, in the sense that maximum current of solenoid G corresponds to minimum clutch pressure, a different modulation signal is required for solenoid G and accordingly, when it is energized in a modulating manner, it is controlled by signals on the lines 272 and 274 for upshift and downshift respectively.

TIMING AND LOGIC CIRCUITS

Figure 4:
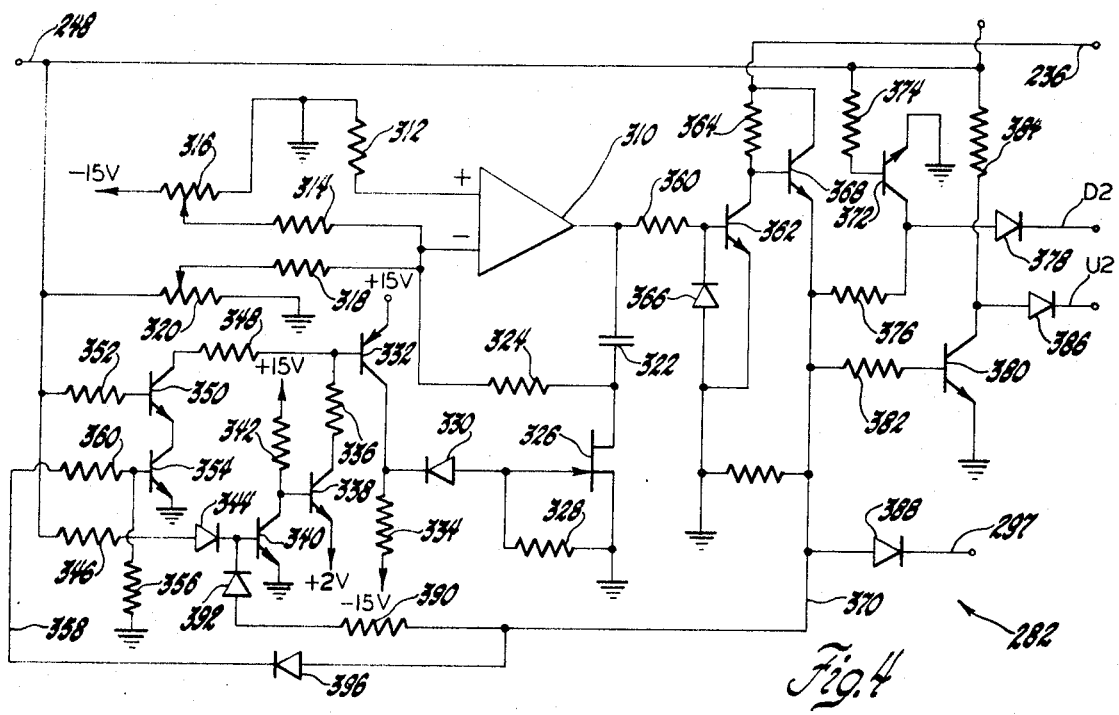
FIG. 4 is a schematic illustration of a timing and logic circuit of FIG. 1.

FIG. 4 illustrates the second timing and logic circuit 282 as being generally typical of all the timing and logic circuits. An operational amplifier 310 is used as an integrating timer. The positive input thereof is connected to ground through a resistor 312 and its negative input is connected through resistor 314 to a potentiometer 316 connected between −15v and ground. The negative input is also connected through an input resistor 318 to another potentiometer 320 connected between ground and line 248 which carries the second ratio energizing signal. The output of the operational amplifier 310 is connected by a feedback line containing an integrating capacitor 322 and a resistor 324 in series to the negative input. A field effect transistor (FET) 326 is connected between ground and a point between capacitor 322 and a resistor 324. The gate of the FET 326 is connected through a resistor 328 to ground so that the FET 326 is normally conducting to connect the capacitor 322 to ground except when the gate is at least −8v relative to the drain electrode and then the FET is switched off. The amplifier output is initially biased positive by the setting of the potentiometer 316. When, however, the line 248 is energized, the amplifier output will tend to decrease provided the appropriate settings of the potentiameters 316 and 320 are selected. The potentiometers are made adjustable to allow for adjustments in the integrating timing for both downshifts and upshifts. The gate of the FET 326 is connected through a diode 330 to the collector of a transistor 332 which is connected between +15v and through a load resistor 334 to −15v. The base of the transistor 322 is connected through a resistor 336 to the collector of a transistor 338 which has its emitter connected to 2v and its base in turn is connected to the collector of a transistor 340, the emitter of which is grounded and the collector of which is connected through a load resistor 342 to +15v. The base of transistor 340 is connected through a diode 344 and a resistor 346 to the line 248. Thus, when the second ratio signal energizes line 248, the transistor 340 conducts, and the transistors 338 and 332 are non-conducting so that nearly −15v is applied to the gate of the FET causing it to turn off and allowing the capacitor 322 to integrate the amplifier output signal so that the output signal will decrease in a linear fashion. The base of the transistor 332 is also connected through a resistor 348 to the collector of a transistor 350 which has its base connected through a resistor 352 to the line 248 and its emitter connected to the collector of transistor 354 having a grounded emitter and its base connected to ground through a resistor 356 and connected to a line 358 through a resistor 360. Thus, when the line 248 is energized the transistor 350 will be biased toward conduction, however, the series transistor 354 will be normally non-conducting until a positive signal is applied on line 358. Until that time, the transistors 350 and 354 will have no effect on the operation of the FET 326. However, when the line 358 does go positive, the transistors 354, 350 and 332 will conduct and the FET 326 will conduct to stop integrating and allow the output of the amplifier to drop suddenly to a negative value.

The amplifier output is connected through a resistor 360 to the base of a transistor 362 having a grounded emitter and having its collector connected through a load resistor 364 to the forward enable line 236, which, of course, is energized prior to the time that a shift to second ratio is requested. A diode 366 connects the base of the transistor 362 to ground. A transistor 368 has its collector connected to line 236, its base connected to the collector of transistor 362 and its emitter connected to a line 370. So lone as the amplifier output is more positive than 0.5v, the transistor 362 will be conducting and the transistor 368 will be non-conducting so that the line 370 is not energized. A transistor 372 has its base connected through a resistor 374 to the line 248, its collector connected through a load resistor 376 to the line 370 and its emitter is connected to ground. The collector is also connected through a diode 378 to the line D2. Thus, so long as the line 248 is energized, the transistor 372 conducts so that no positive signal can be applied to the line D2, even if the line 370 were energized. A transistor 380 has its emitter grounded, its base connected through a resistor 382, to line 370, and its collector connected through resistor 384 to line 248 and also through a diode 386 to the line U2. Thus, so long as line 370 is not energized, and line 248 is energized, the transsitor 380 will be non-conducting and a positive signal will be applied to line U2.

The integrator is preferably set for a time of approximately 2.4 seconds so that at the expiration of that time, the output of the amplifier 310 will have decreased to 0.5v turning off the transistor 362 and turning on the transistor 368 to apply a positive voltage to the line 370 which turns on the transistor 380 to remove the signal from the line U2. The line 370, however, is connected through a diode 388 to line 297 which is therefore energized when the line 370 is energized. The line 370 is connected through a resistor 390 and a diode 392 to the base of the transistor 340 to maintain that transistor conducting even if the line 248 were deenergized. The line 370 is also connected through a diode 396 to the line 358 to turn on the transistor 354 and therefore turn on the transistors 350, 332 and the FET 326 to ground the capacitor 322 and allow the amplifier output to drop to its negative value which will be maintained so long as the line 248 is energized.

In summary, before the line 248 is first energized to call for an upshift to the second ratio, the output of amplifier 310 is at some positive value, say 13v, and holding steady while the capacitor 322 is grounded through the FET 326. When the line 248 is first energized, the FET 326 turns of and the amplifier 310 starts integrating downwardly. At the same time a positive signal is produced on the line U2. After 2.4 seconds, the amplifier output decreases to 0.5v so that the line 370 is energized to energize the line 297 and deenergize line U2. At the same time, the line 358 is energized to cause the FET 326 to conduct and allow the output voltage of the amplifier to go negative. For downshift from second to first ratio, the operation of the timing and logic circuit is essentially reversed. Thus, when downshift is called for by the removal of the signal from the line 248, the transistor 372 will cease conduction and a positive signal will be applied on the line D2. Simultaneously, the transistor 350 will cease conducting so that the transistor 332 and the FET 326 also cease conducting so that the amplifier output begins integrating in a positive direction. When the output again reaches a +0.5v the transistor 362 will conduct to turn off the transistor 368 to remove the voltage from the line 370 as well as from the lines D2 and 297. The transistor 394 will cease conducting to allow transistors 338 and 332 to conduct so that the FET 326 will conduct allowing the amplifier output to suddenly increase to its initial positive voltage.

GATE AND OUTPUT DRIVERS

Figure 5:
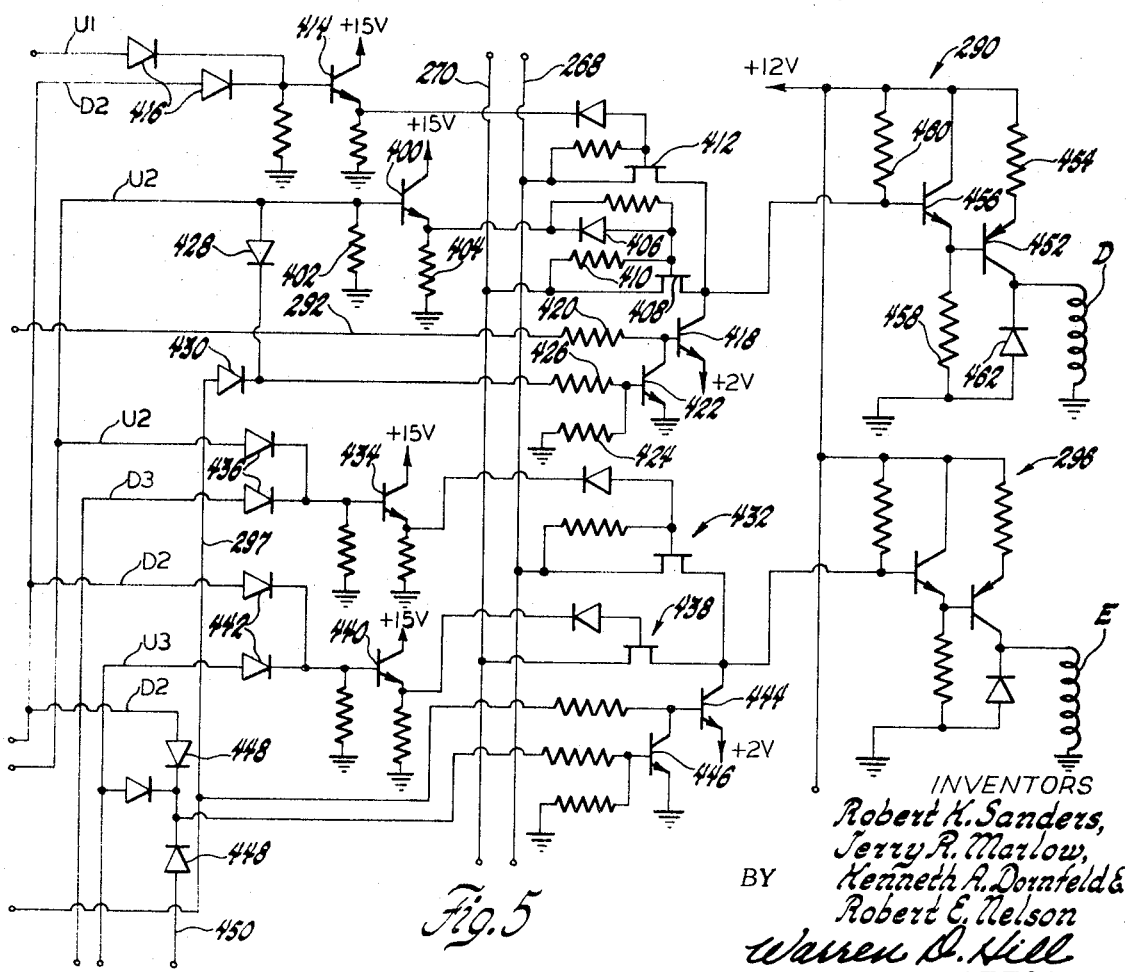
FIG. 5 is a schematic illustration of the gate circuit and output drivers of FIG. 1.

FIG. 5 ilustrates that portion of the gate 276 most directly related to the second timing and logic circuit 282 as well as the output drivers 290 and 296 which energize the solenoids D and E respectively. When the transmission is in the first ratio, the solenoid D is fully energized and the first ratio brake 58 is fully applied. To accomplish an upshift to the second ratio, it is necessary to release the brake 58 and apply the second ratio brake 56. To achieve this, the solenoids D and E are deenergized and energized respectively in a modulated manner to assure a smooth shift. The line 268 from the modulation computer 262 carries the modulation signal for an oncoming clutch or brake and the line 270 carries the modulated signal for an offgoing clutch or brake. The gate circuit connects the lines 268 and 270 to the appropriate output driver according to the command from the timing and logic circuits. As described above, when an upshift to second ratio is requested, the line U2 is energized for 2.4 seconds. The line U2 is connected to the base of a transistor 400 and to a resistor 402 extending to ground, its collector is connected to +15v, and its emitter is connected through a load resistor 404 to ground. The emitter is also connected through a diode 406 to the gate of an FET 408 which is connected between the line 270 and the output driver 290. The FET gate is connected to the source electrode by a resistor 410. The votlage on line 270 is always in excess of 8v and the gate of the FET is normally grounded through the diode 406 and the resistor 404 so that the gate is therefore at least 8v negative relative to the source electrode so that the FET will be nonconductive. When, however, the line U2 is energized, the transistor 400 conducts to back-bias the diode 406 whereupon the source voltage is applied to the gate of the FET 408 and the FET switches on to connect the line 270 to the output driver 290. A similar FET switching circuit 412 connects the line 268 to the output driver 290. The latter FET switch is controlled by transistor 414 which has its base connected through diodes 416 to lines U1 and D2. The inputs of the output driver 290 are connected to the collector of a transistor 418 which has its emitter connected to a source of +2v and its base is connected through a resistor 420 to line 292 from the first and reverse timing and logic circuit 280. Thus, when line 292 is energized, to a voltage greater than 2v, transistor 418 will conduct to force the output amplifier 290 into full conduction. The base of the transistor 418 is further connected to the collector of a transistor 422 having a grounded emitter and having its base connected through a bias resistor 424 to ground and through a resistor 426 and diodes 428 and 430 to lines U2 and 297 respectively. Thus, when either of the lines U2 and 297 are energized, the transistor 422 will conduct to prevent conduction of the transistor 418. The input of the output driver 296 is connected to a switching circuit the same as that described above. The circuit includes an FET switching circuit 432 controlled by a transistor 434 having its base connected through diodes 436 to the lines U2 and D3. An FET switching circuit 438 is controlled by the transistor 440 which has its base connected through diodes 442 to lines D2 and U3. A first switching transistor 444 is controlled by the signal on line 297 while a second switching transistor 446 has its base connected through diodes 448 to the lines D2, U3 and 450. As will be seen in FIG. 1, the line 450 is the output from the third timing and logic circuit 284 which corresponds in function to the line 297 of the second timing and logic circuit.

In operation of the gate circuit, it will be apparent that prior to the shift from first to second ratio, the line 292 will be energized to render the transistor 418 conducting so that the output driver 290 will be biased full on to energize the solenoid D. All of the inputs to the switching circuitry controlling the output driver 296 are off so that the output driver 296 and the solenoid E are deenergized. When an upshift to second ratio is requested, the line U2 is energized for 2.4 seconds so that the transistor 400 and the FET 408 are conducting and the line 270 is connected to the inpu of the output driver 290 so that an offgoing modulation signal will be applied to the solenoid D. The signal on line U2 is also connected through the diode 428 to the transistor 422 to turn on that transistor and turn off the transistor 418 to override the signal U on the line 292. Line U2 also renders the transistor 434 and the FET switch 432 conductive so that the line 268 is connected to the input of the output driver 296 and the solenoid E is then energized in a modulated fashion according to the oncoming modulation signal on line 268. By the time the 2.4 second timing has expired, a normal modulated shift will have become completed so that the solenoid D is deenergized and the solenoid E is fully energized. In the event this has not occurred for some reason, a complete shift will be effected at the end of the time period. Then the positive signal is removed from the line U2 and a signal is instead impressed on the line 297. The latter signal renders the transistor 444 conductive to fully energize the output driver 296 and the solneoid E and the removal of the signal on line U2 will render the transistor 400 non-conductive to switch off the FET 408 causing the output driver 290 to become completely deenergized. It should be noted that the transistor 422 will remain conductive to the right of the signal on line 292 since the signal on line 297 is applied through the diode 430 to the base of the transistor 422.

In the event a downshift from second to first ratio is requested, the line D2 will be energized to switch on the transistor 446 and switch off the transistor 444 thereby overriding the signal on line 297. The signal on line D2 also switches on the transistor 440 and the FET switching circuit 438 to connect the offgoing modulation signal on line 270 to the input of the output driver 296. The signal on line D2 also switches on the transistor 414 and the FET switching circuit 412 to connect the oncoming modulation signal on line 268 to the output driver 290. Accordingly, the brake associated with solenoid D will be modulated on and the brake associated with solenoid E will be modulated off. At the end of the 2.4 second downshift period, the signals will be removed from lines 297 and U2 so that the solenoid E can no longer be energized. The pre-existing signal on line 292 will now be able to switch on transistor 418 to maintain the output driver 290 fully energized.

The portion of the gate circuit just described is generally typical of the entire gate circuit 276 which may be fully reproduced by expanding the logic and principles employed in FIG. 5. The only exception is that the oncoming and offgoing modulation signals to be applied to solenoid G are derived from lines 272 and 274 and that there is a provision for fully energizing the solenoid G during operation of the timer 30 and during operation of the neutral solenoid A as indicated by the energization of the line 306 as seen in FIG. 1.

The output driver 290 comprises an output transistor 452 having its emitter connected through a power resistor 454 to a source of 12v and its collector connected directly to the solenoid D. The base of the transistor 452 is connected to the emitter of transistor 456 which has its collector connected directly to 12v and its emitter connected through a load resistor 458 to ground. The base of the transistor 456 is connected through a biasing resistor 460 to 12v and serves as the input to the output driver. A diode 462 is connected between ground and the collector of the transistor 452 to suppress voltage spikes occurring upon the rapid deenergization of the solenoid D. With no input signal applied the base of the transistor 456 will be held at a high voltage due to the bias resistor 460 and that transistor will conduct to impress substantially 12v on the base of the transistor 452 so that the latter will be held nonconducting and there will be no output current to the solenoid. When approximately 12v is applied to the base of transistor 456 by the gate circuit 276, exactly the same conditions occur and there is no output. When, however, the input voltage to the base of transistor 456 is lowered by only a few volts, the transistor 456 will become less conductive to decrease the voltage on the base of the transistor 452 to render the output transistor conductive to an extent determined by the input voltage. The circuit is so designed that should the input voltage decrease to nearly 8v, the output transistor 452 will become fully conductive, as limited by the resistance in circuit therewith, to fully energize the solenoid D. Thus, if a modulated signal is applied to the output driver, the solenoid D will receive a modulated current. The output driver 296 as well as the output drivers for solenoids F and D are identical to the output driver 290.

MODULATION COMPUTER

The modulation computer generates its signals for modulation of the oncoming and offgoing brakes and clutches so that the ratio change is effected smoothly, that is, without abrupt or extreme variations in output torque of a transmission. To that end, it is desirable to control the torque capacities of the torque transmitting devices in a manner which is independent of the particular characteristics of the device. This is so because the characteristics of the various devices (clutches and brakes) are not identical and moreover, the characteristics change from time to time, for example, due to changes of transmission fluid viscosity with age and with temperature and due to changes in the coefficient of friction of the friction engaging surface. In addition, the hydraulic motors operating the devices may vary in capacity or may have different amounts of leakage so that a simple time relationship cannot be used to determine the torque capacities of such devices. Accordingly, the subject control system provides a closed loop control to apply or relieve pressure to the devices according to a predetermined program and to monitor the feedback effects of the torque capacities of the devices by sensing variations in the input shaft speed. Pressures are varied to control the input shaft acceleration according to a predetermined program. If desired, the change in speed of another rotary member in the transmission such as the sun gear hub 46 may be used as an input signal as long as that member experiences an acceleration during each ratio change.

For an upshift, the pressure on the oncoming device is modulated according to the following equation:

$$P\text{-on} = K_1 - K_2 + K_3 \dot{N} - K_4 \int (R_1 - \dot{N}) \, dt \quad (1)$$

The pressure of the offgoing device is controlled according to the following equation:

$$P\text{-off} = K_5 - K_6 \int (R_2 - \dot{N}) \, dt \quad (2)$$

In the equations the $K_2$, $K_3$, $K_4$ and $K_6$ terms are applied at the trigger point of
$\dot{N} = -250$ rpm/sec where $\dot{N}$ is the acceleration of the input shaft, and
$K_1 = 50$ psi
$K_2 = 10$ psi
$K_3 = 0.022$ psi/rpm/sec
$K_4 = 0.225$ psi/rpm
$K_5 = 40$ psi
$K_6 = 0.225$ psi/rpm
$R_1$ varies linearly with engine speed (which equals input shaft speed $N$) from a minimum of $-800$ rpm/sec at 60 percent of engine speed to $-1,333$ rpm/sec at 100 percent engine speed, and
$R_2 = 300$ rpm/sec initially and 1,350 rpm/sec after the trigger point ($-250$ rpm/sec).

The terms $K_1 - K_6$, $R_1$ and $R_2$ are scaling factors determined by vehicle system parameters such as torques, inertias, speeds and stability requirements. Optionally, where vehicle inertia is subject to large variations as in the case of a loaded versus an unloaded truck, $K_1$ may be varied in direct proportion to input torque, or a function thereof as measured, for example, by gasifier speed or throttle position depending upon the type of engine used. Such variations of $K_1$ achieves an initial clutch torque capacity consistent with engine power and system inertia.

Figure 6B:
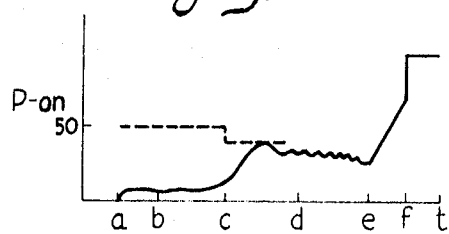
Figure 6C:
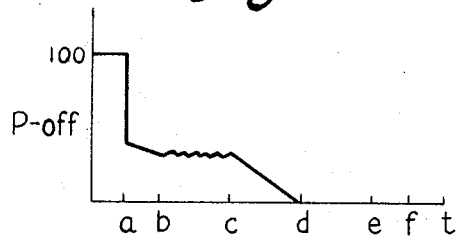

The effects of the equations 1 and 2 on clutch pressure are graphically represented in FIGS. 6a, b and c wherein FIG. 6a represents input shaft speed $N$ versus time, FIG. 6b represents P-on versus time and FIG. 6c represents P-off versus time. The engine speed is initially at some constant value until point a when a shift requested is initiated. At that point, the pressure of the oncoming device is zero and the pressure of the offgoing device is maximum, say 100 psi. At that point, the equations (1) and (2) are brought into play to modulate the device pressures. The $K_1$ term requests a pressure of 50 psi on the oncoming device, as shown by dotted line. However, the pressure cannot increase to that value immediately because the hydraulic motor needs time to fill. Accordingly, the actual oncoming pressure remains very small for a time. The $K_5$ term requests a pressure of 40 psi to bring the pressure of the offgoing device to a pressure near that at which the device may begin to slip. The $K_6$ term gradually decreases the offgoing pressure until at point b the clutch begins to slip and the engine speed begins to increase. Thereafter the $K_6$ term causes the offgoing pressure to modulate and limit the amount of slipping so that the engine acceleration does not exceed $R_2$ or 300 rpm/sec to prevent undue engine flare. When at point c, the oncoming device begins to take effect, the input speed decreases to the trigger point of $-250$ rpm/sec. At that point, the $R_2$ value increases substantially and causes the offgoing pressure to gradually decrease to zero. At point c, the $K_2$ term comes into effect to reduce the requested oncoming pressure as shown by the step function in the dotted line and the $K_3$ and $K_4$ terms come into play. The $K_3$ term rapidly drops the oncoming pressure to a value below that required to sustain the desired deceleration and the $K_4$ term then further modulates the pressure so that the actual acceleration equals the term $R_1$ which is the programmed reference acceleration until point e when the shift is completed. Between the points c and e, the speed curve is concave due to the variation of $R_1$ with speed. It has been demonstrated that controlling in this manner rather than a straight line deceleration maintains a flatter output torque curve and consequently leads to improved smoothness of shift. After point e, the $\dot{N}$ term is zero and the $K_4$ term then causes a rapid oncoming pressure rise toward line pressure. By point f, the 2.4 second time delay has expired and the oncoming device is forced to full line pressure if it has not already achieved that value. The graphs clearly illustrate one of the advantages of the subject control, that is, the device fill time between points a and c may vary greatly with the offgoing pressure and accordingly, the input shaft speed is precisely controlled to a desired rate regardless of the fill time.

Figure 7A:
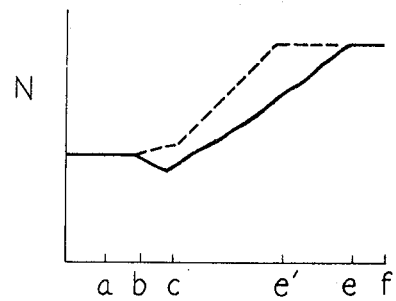

During downshift, the offgoing clutch pressure is the same as equation (2) except that the trigger point is $+500$ rpm/sec. The equation for the oncoming clutch during a downshift is as follows:

$$P\text{-on} = K_1 - K_2 - K_3 \dot{N} + K_4 \int (K_7 - \dot{N}) \, dt \quad (3)$$

where
$K_7 = 1,250$ rpm/sec and
$K_2$, $K_3$ and $K_4$ terms act at the trigger point of $+500$ rpm/sec FIGS. 7a, b and c graphically illustrate the modulation of clutch pressures and their effect on input speed $N$ during a downshift. First, in the case of a closed throttle downshift (as shown in solid lines), when a shift is requested at point a, the offgoing clutch pressure drops from 100 psi to 40 psi as dictated by $K_5$. At the same time, the oncoming device begins to fill as requested by $K_1$. The engine tends to pull down the speed of the input shaft and at point b, the offgoing pressure is low enough to allow the offgoing device to slip so that the shaft speed does in fact begin to decrease. The speed decrease continues until the oncoming pressure increases enough for the oncoming device to pull the input speed up. At point c, $+500$ rpm/sec input speed is attained to trigger the $K_2$, $K_3$ and $K_4$ terms so that as in the case of the upshift, the oncoming clutch modulates to control the input speed acceleration. The programmed desired deceleration is $K_7$ (1,250 rpm/sec)

and the $K_4$ term modulates the oncoming pressure to maintain the acceleration at the desired rate until point e when the shift is completed. In the meantime, the offgoing device has dropped out because the $R_2$ value of 1,350 rpm/sec after the trigger is much larger than $\dot{N}$ which is being controlled to 1,250 rpm/sec. At point $f$, the 2.4 second time delay has expired and full line pressure is applied to the oncoming clutch.

Figure 7B:
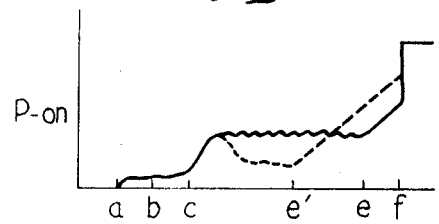
Figure 7C:
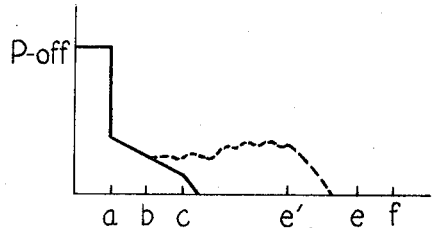

In the case of a full power downshift, the control operation is somewhat different as shown in FIG. 7 in dotted lines. In that case, the engine tends to increase the input shaft speed and at point $b$, the offgoing clutch modulates in an attempt to hold the shaft acceleration to the value of $R_2$ (300 rpm/sec). However, when the oncoming clutch begins to take hold at point $c$, it further increases the shaft speed to 500 rpm/sec which is the trigger point and $R_2$ changes to 1,350 rpm/sec. Then the offgoing clutch pressure continues to modulate to hold the input acceleration to that new value. Since the $K_7$ term is smaller than the actual input speed, the oncoming pressure decreases until the shift is completed at point e whereupon $\dot{N}$ becomes zero and the oncoming pressure increases as the offgoing pressure decreases.

The purpose of the modulation computer 262 then is to generate electrical signals corresponding to the equations (1), (2) and (3) for appropriately controlling the pressure of the torque transmitting devices during a ratio shift.

Referring to FIG. 8, the upshift line 264 which is energized by the timing and logic circuits as shown in FIG. 1, is connected to a switching circuit 470 which is connected through an input resistor 472 to the base of a transistor 474 having a grounded emitter and a biasing resistor 476 between the base and ground. The collector is connected through a resistor 478 to the base of a transistor 480 which has its emitter connected to +15v and its collector connected through a resistor 482 to −15v. The collector is also connected through a resistor 484 to the base of a transistor 486 having its emitter connected to +15v and its base connected through a biasing resistor 488 to +15v while the collector is conected through a resistor 490 to −15v. An FET 492 is connected between line 264 which carries the input shaft acceleration signal $\dot{N}$ and an output line 494. The source of the FET is connected through a resistor 496 to the gate which in turn is connected through a diode 498 to the collector of the transistor 480. A second FET 500 is connected between ground and the output line 494 and a resistor 502 is connected between ground and the gate which in turn is connected through a diode 504 to the collector of transistor 486. In operation, with no signal on the upshift line 264, the transistors 474 and 480 are non-conducting so that −15v is applied through the resistor 482 and diode 498 to the gate of the FET 492, which is thereby turned off. The base of the transistor 486 then goes to a sufficiently low voltage to permit the transistor 486 to turn on to back bias the diode 504 to allow the FET 500 to conduct so that ground potential is applied to the output line 494. When a positive upshift signal is impressed on the line 264, all the transistors change state so that the signal $\dot{N}$ is impressed on the output line 494.

A second switching circuit 506 identical to the switching circuit 470 has as its input line 266 which carries the downshift signal and provides on its output line 508 the signal $\dot{N}$ when the downshift signal is present. Otherwise, the line 508 is at ground potential.

Switching circuit 510 comprises a transistor 512 having its base connected through a resistor 514 to the upshift line 264, its emitter connected to ground and its base connected through a biasing resistor 516 to ground. The collector is connected through a resistor 518 to the base of a transistor 520 having its emitter connected to +15v and its collector connected to an output line 522. When there is no signal on the upshift line 264, the transistors 512 and 520 will be non-conducting and there will be no signal on output line 522. When, however, there is a signal on line 264, the transistors switch on to apply 15v to the output line 522. The switching circuit 524 identical to the switching circuit 510 is connected to the downshift line 266 and produces an output on line 526 when the downshift line is energized. Still another switching circuit has as inputs the upshift line 264 and the downshift line 266 which are connected through a pair of diodes 528 and through a resistor 530 to the base of a transistor 532 which has a grounded emitter and a bias resistor 534 connected from the base to ground. The collector is connected through a resistor 536 to +15v and is also connected to the base of a transistor 538 having a grounded emitter and having its collector connected through a resistor 540 to the base of a transistor 542 which has its emitter connected to +15v and its collector connected through a load resistor 544 to −15v. When neither an upshift nor a downshift signal is present, the transistor 532 is turned off and the transistors 538 and 542 are turned on to apply approximately +15v to an output line 546 at a collector of the transistor 542. When, however, an input signal is applied to either diode 528, the transistors all change state and −15v is applied to the output line 546.

A circuit 548 is provided to generate the acceleration signal $R_1$. The circuit comprises a transistor 550 having a grounded collector and its emitter connected through a load resistor 552 to +15v. A resistor 554 is connected between +15v and the base while a resistor 556 is connected between base and ground. Line 257 carrying the input shaft speed signal is connected through a diode 558 to the base of the transistor 550. In operation, the maximum conduction of the transistor 550 and consequently the lowest emitter voltage is established by the resistors 554 and 556. The components are so selected that the minimum emitter voltage will represent that which corresponds to 60 percent engine speed. When the speed signal on line 257 attains a value corresponding to a higher engine speed, the current passed by the diode 558 will further decrease the conductivity of the transistor 550 to increase the emitter voltage to a maximum value corresponding to 100 percent engine speed. The emitter is connected through an FET 560 to an output line 562 which is connected to ground through a resistor 564 so that the output line carries a ground voltage when the FET is turned off and carries the emitter voltage representing $-R_1$ when the FET is turned on (since the voltage is positive and $R_1$ is defined as a negative value). The FET gate is connected through a resistor 566 to the emitter of transistor 550 and is also connected to the collector of the transistor 480 in the switching circuit 470. Thus, when the upshift line 264 is not energized, −15v is applied to the gate to turn off the FET and the output line 562 will be near ground potential. However, when the upshift line 264 is energized, +15V is applied to the gate of the FET 560 through the transistor 480 allowing the FET to conduct to apply the signal $-R_1$ to the line 562.

An integrator 570 comprises an operational amplifier 572 having its positive input connected through input resistors 574, 576 and 578 to the lines 562, 494 and 526 respectively, the latter connection being made through a potentiometer 580. The positive input is also connected to ground through a resistor 582. The negative terminal of the operational amplifier is connected to ground through a resistor 584 and to line 508 through an input resistor 586 and to a feedback circuit comprising a diode 588, a capacitor 590, a resistor 592 in series. An FET 594 is connected across the feedback circuit and has its gate connected through a resistor 596 to the amplifier output and also connected through a diode 598 to the output of a trigger amplifier 600.

The trigger amplifier 600 includes an operational amplifier 602 having its positive input connected through a resistor 604 and a diode 606 to line 546 and further connected through input resistor 608 to the line 494. The positive input is also connected to ground through a resistor 610 and to a feedback circuit comprising a resistor 612 and a diode 614 in series. The negative input of the operational amplifier is connected through a resistor 616 to the line 508 through a resistor 618 to $-15v$ and to ground through a resistor 620. The output of the amplifier 602 is connected to ground through a resistor 622 and is connected to the negative input through a noise suppressing capacitor 624. Normally the trigger amplifier 600 has a positive output which back biases the diode 598 to cause conduction of the FET 594 to shunt the integrator circuit 570 so that the integrator output will be zero. When, however, an upshift signal occurs on lines 264, the line 546 will go negative and the line 494 will carry the acceleration signal $\dot{N}$. When $\dot{N}$ reaches a value of $-250$ rpm/sec, which is the upshift trigger point, the trigger amplifier 600 will produce a negative output which turns off the FET 594 and allows the integrator 570 to start integration.

During an upshift all the inputs to the integrator 570 are at ground potential except the lines 562 and 494 which carry signals corresponding to $-R_1$ and $\dot{N}$ respectively. The integrator output will be a signal proportional to $K_3\dot{N} - K_4 \int (R_1 - \dot{N})dt$. The $K_3\dot{N}$ term occurs since due to the resistor 592 in the feedback circuit, a proportional output as well as an integrated output occurs. Of course, a term proportional to $R_1$ also occurs in the output circuit but that term is insignificant relative to $K_3\dot{N}$, particularly with respect to the dynamic aspects of the equation, and therefore for practical purposes it is lumped in with $K_3\dot{N}$.

The output of the integrator 570 is fed through the diode 588 (so that its output is always positive, or pressure-adding), a potentiometer 626 and an input resistor 628 to the negative terminal of an inverting amplifier 630 which comprises an operational amplifier having its positive input grounded through a resistor 632 and having a feedback resistor 634 connected to the negative input terminal. The negative input is connected to ground through a resistor 636 and is connected through a resistor 638 to a potentiometer 640 which is connected between ground and a diode 642 which in turn is connected to the output of the trigger amplifier 600. The potentiometer 640 is adjusted to select a value proportional to $-K_2$. The output of the amplifier 630 then will be proportional to $+K_2 - K_3\dot{N} + K_4 \int (R_1 - \dot{N}) dt$.

That output is connected through an input resistor 644 to the positive input of an operational amplifier 646 which has a feedback resistor 648 connected to the negative input. The negative input is connected to ground through a resistor 650 and is connected through an input resistor 652 to a potentiometer 654 extending from +15v to ground. The potentiometer 654 is adjusted to provide a signal representing $K_1$. The positive input of the amplifier is connected to 12v through an input resistor 656 and is connected to ground through a resistor 658. The output of the amplifier 646 then will be $12v - K_1 + K_2 - K_3\dot{N} + K_4 \int (R_1 - \dot{N})dt$. When this signal is applied to one of the output drivers 290, etc., there is produced a solenoid current proportional to equation (1).

Since the valve associated with solenoid G is opposite in operation to the other modulation valves, the input current must be modified to accommodate that difference. Accordingly, the signal on line 272 is somewhat different from that on line 268. This is accomplished by an amplifier 660. That amplifier has its positive input connected through an input resistor 662 to +12v and connected to ground through a resistor 664. The negative input is connected through input resistor 666 to the output of the amplifier 630, and through an input resistor 668 to a potentiometer 670 connected between +15v and ground. The negative input is also connected to ground through a resistor 672 and to a feedback resistor 674. The potentiometer 670 is adjusted to select a value $K_1$ different from that selected by the potentiometer 654. The output on line 272 will therefore correspond to $12v - K_1 - K_2 + K_3\dot{N} - K_4 \int (R_1 - \dot{N})dt$.

During a downshift, the operation of the circuit just described is modified to produce equation (3). When a downshift is indicated, the line 494 is grounded, the line 546 is positive and the line 508 carries the signal $\dot{N}$ so that the trigger circuit 600 will switch to a negative value at +500 rpm/sec. The inputs to the integrator 570 will be zero except that the line 508 will carry the signal $\dot{N}$ and the potentiometer 580 will be energized and is adjusted to produce a signal representing $K_7$. The output of the integrator 570 then will be $-K_3\dot{N} + K_4 \int (K_7 - \dot{N})dt$ as required by equation (3). The remainder of the circuit functions in the manner previously described to produce on the output lines 268 and 272 signals which will provide solenoid currents satisfying equation (3).

A circuit including an integrator 680 and amplifiers 682 and 684 produces output signals on lines 270 and 274 to provide offgoing pressure modulation as required by equation (2). The integrator 680 has its positive input connected through input resistors 686 and 688 to line 508 and 494 which carries the signal $\dot{N}$ during downshift and upshift respectively. The input is also connected to ground through a resistor 690 and is also connected through an input resistor 692 to a potentiometer 694 which is connected between ground and the diode 642 at the output of the trigger amplifier 600. The negative input terminal is connected through input resistors 696 and 698 which are connected to potentiometers 700 and 702 which are connected with lines 522 and 526 which carry +15v during upshift and downshift respectively. The negative input is also connected to ground through a resistor 704 and a feedback circuit comprising integrating capacitor 706 and a diode 708 in series. The feedback circuit is shunted by an FET 710, the gate of which is connected by a resistor 712 to the integrator output. A diode 714 connects the gate to line 546 so that the feedback circuit is shunted prior to a shift request but the FET is turned off upon a shift request to allow integration to begin. At the beginning of an upshift, line 494 is energized with a signal corresponding to $\dot{N}$ and the potentiometer 700 is energized producing a signal corresponding to $R_2 =$ 300 rpm/sec. Initially, the potentiometer 694 is deenergized. The output of the integrator 680 then will be $-K_6 \int (R_2 - \dot{N})dt$. At the upshift trigger point of $-250$ rpm/sec, the trigger amplifier 600 switches to energize potentiometer 694 which adds an input equivalent to 1,650 rpm/sec to the positive input of the integrator. The net result of this new input when combined with the input from the potentiometer 700 is to change the value of $R_2$ to 1,350 rpm/sec. The output of the integrator is connected to the negative input of amplifier 682 through a resistor 716. The negative input is also connected through an input resistor 718 to a potentiometer 720 extending between +15v and ground which establishes an input signal equivalent to $K_5$. The negative input is also connected through a resistor 722 to ground and to a feedback resistor 724. The positive input of the amplifier is connected through a resistor 726 to +12v and through a resistor 728 to ground. The output of the amplifier 682 therefore will be $12v - K_5 + K_6 \int (R_2 - \dot{N})dt$. The amplifier 684 produces a modified form of the modulation signal to energize the solenoid G. That amplifier has connected to its positive input resistors 730 and 732 which are connected to +12v and the output of the integrator 680 respectively. The positive input is connected through a resistor 734 to ground. The negative input is connected to a feedback resistor 736 to ground through a resistor 738 and through an input resistor 740 to a potentiometer 742 extending from +15v to ground. The potentiometer establishes a value of $K_5$ which is different from that established by the potentiometer 720. The output line 274 therefore carries the signal equivalent to $12v - K_5 - K_6 \int (R_2 - \dot{N}) dt$.

It will thus be seen that the control described herein is effective when applied to the operation of a single torque transmitting device to achieve a smooth engagement or disengagement of the device and that the acceleration of the input member can be accurately controlled according to a programmed desired acceleration, the programmed acceleration being selected to minimize torque fluctuations. The same considerations apply when an off-going and oncoming device are involved in a ratio shift and in that case, both devices are simultaneously modulated so that both positive acceleration and deceleration of the input member can be closely controlled.

The embodiment of the invention herein is for the purposes of illustration and the scope of the invention is intended to be limited only by the following claims.

It is claimed:

1. In a control for an engageable torque transmitting device including a rotary member subject to acceleration during engagement of the device, the combination comprising pressure responsive means for engaging the torque transmitting device, and control means regulating the pressure responsive means during engagement of the torque transmitting device for establishing a desired acceleration of the rotary member according to a predetermined program, the control means including acceleration sensing means for sensing the acceleration of the rotary member, pressure requesting means for requesting a pressure in excess of that required to achieve the desired acceleration, so that partial engagement of the device is rapidly effected and an acceleration of the rotary member occurs, acceleration responsive means operatively connected with the acceleration sensing means actuated by a predetermined acceleration of the rotary member for rapidly decreasing the requested pressure as a function of the acceleration to approximate that pressure required to achieve the desired acceleration, and means for varying the pressure according to the difference between the desired acceleration and the actual acceleration to accurately regulate the acceleration of the rotary member to the programmed acceleration.

2. In a control for an engageable torque transmitting device for smoothly establishing drive between driving and driven members, the combination comprising pressure responsive means for engaging the torque transmitting device, and control means regulating the pressure responsive means during engagement of the torque transmitting device for establishing a desired acceleration of the driving member according to a predetermined program, the control means including acceleration sensing means for sensing the acceleration of the driving member, pressure requesting means for requesting a pressure in excess of that required to achieve the desired acceleration so that partial engagement of the device is rapidly effected and an acceleration of the driving member occurs, acceleration responsive means operatively connected with the acceleration sensing means actuated by a predetermined acceleration of the driving member for rapidly decreasing the requested pressure as a function of the acceleration to establish the approximate pressure required to achieve the desired acceleration, and means for varying the pressure according to the difference between the desired acceleration and the actual acceleration to accurately regulate the acceleration of the driving member to the programmed acceleration.

3. In a control for an engageable torque transmitting device for smoothly establishing drive between driving and driven members, the combination comprising pressure responsive means for engaging the torque transmitting device, and electronic control means regulating the pressure responsive means during engagement of the torque transmitting device for establishing a desired acceleration of the driving member according to a predetermined program, the control means including sensor means for electrically sensing acceleration of the driving member, command means for producing a command signal requesting engagement of the device, electronic programming means responsive to the command signal for producing a programmed desired acceleration signal, means for requesting a pressure in excess of that required to achieve the desired acceleration so that partial engagement of the device is rapidly effected and an acceleration of the driving member occurs, means responsive to the sensor means actuated by a predetermined acceleration of the driving member to rapidly decrease the requested pressure as a function of the acceleration to establish the approximate pressure required to achieve the desired acceleration, and means responsive to the sensor means and the programming means for varying the pressure according to the time integral of the difference between the programmed desired acceleration and the actual acceleration to accurately regulate the acceleration of the driving member to the programmed desired acceleration.

4. In a multi-ratio transmission having a pair of selectively engageable torque transmitting devices, pressure responsive means for engaging one of the devices and disengaging the other of the devices for effecting a ratio change and a rotary member subject to acceleration during a ratio change, control means regulating the pressure responsive means during engagement and disengagement of the torque transmitting devices, the control means including command means for producing a command signal requesting a ratio change, programming means responsive to the command signal for producing a programmed desired acceleration of the rotary member, means effective during an initial shift phase for requesting a pressure on the engaging device in excess of that required to achieve the programmed acceleration, the pressure required to achieve the programmed acceleration being achieved after a time delay period due to slow initial response of the pressure responsive means, means effective at least during the time delay period for modulating the pressure on the disengaging device as a function of rotation of the rotary member, means effective after the initial shift phase actuated by a predetermined acceleration of the rotary member to rapidly decrease the requested pressure on the engaging device as a function of acceleration of the rotary member to establish the approximate pressure required to achieve the programmed acceleration, means for varying the pressure on one of the devices according to the difference between the programmed acceleration and the actual acceleration to accurately regulate the acceleration of the rotary member to the programmed acceleration, and means for removing the pressure on the disengaging device when the engaging device assumes control of the rotary member acceleration.

5. In a multi-ratio transmission having a driving input member, a driven output member, a pair of selectively engageable torque transmitting devices, and pressure responsive means for engaging one of the devices and disengaging the other of the devices for effecting a ratio change, control means regulating the pressure responsive means during engagement and disengagement of the torque transmitting devices for establishing an acceleration of one of the members according to a programmed acceleration, the control means including means effective during an initial shift phase for requesting a pressure on the engaging device in excess of that required to achieve the programmed acceleration, the pressure required to achieve the programmed acceleration being achieved after a time delay period due to slow initial response of the pressure responsive means, means effective at least during the time delay period for modulating the pressure on the disengaging device as a function of acceleration of the one member to permit limited acceleration of the one member, means effective after the initial shift phase actuated by a predetermined acceleration of the one member to rapidly decrease the requested pressure on the engaging device as a function of acceleration of the one member to establish the approximate pressure required to achieve the programmed acceleration, means for varying the pressure on one of the devices according to the difference between the programmed acceleration and the actual acceleration to accurately regulate the acceleration of the one member to the programmed acceleration, and means for gradually removing the pressure on the disengaging device when the engaging device assumes control of the one member acceleration.

6. In a multi-ratio transmission having a driving input member, a pair of selectively engageable torque transmitting devices, and pressure responsive means for engaging one of the devices and disengaging the other of the devices for effecting a ratio change, control means regulating the pressure responsive means during engagement and disengagement of the torque transmitting devices for establishing a deceleration of the driving member according to an upshift programmed deceleration, the control means including programming means operative within a prescribed range of speed of the driving member for varying the desired deceleration according to the speed of the driving member for decreasing the desired deceleration as speed decreases, means effective during an initial upshift phase for requesting a pressure on the engaging device in excess of that required to achieve the programmed deceleration, the pressure required to achieve the programmed acceleration being achieved after a time delay period due to slow initial response of the pressure responsive means, means effective at least during the time delay period for decreasing the pressure on the disengaging device and then modulating the pressure as a function of acceleration of the driving member to permit limited positive acceleration of the driving member, and including means actuated upon a predetermined deceleration of the driving member for gradually removing pressure in the disengaging device, means effective after the initial upshift phase actuated by a predetermined deceleration of the driving member to rapidly decrease the requested pressure on the engaging device as a function of the driving member deceleration to establish the approximate pressure required to achieve the programmed deceleration, and means for varying the pressure on the engaging device as a function of the difference between the programmed deceleration and the actual deceleration to accurately regulate the deceleration of the driving member to the programmed deceleration.

7. In a multi-ratio transmission having a driving input member, a pair of selectively engageable torque transmitting devices, and pressure responsive means for engaging one of the devices and disengaging the other of the devices for effecting a ratio change, control means regulating the pressure responsive means during engagement and disengagement of the torque transmitting devices for establishing a desired positive acceleration of the driving member according to a programmed downshift positive acceleration, the control means including means effective during an initial downshift phase for requesting a pressure on the engaging device in excess of that required to achieve the programmed positive acceleration, the pressure required to achieve the programmed acceleration being achieved after a time delay period due to slow initial response of the pressure responsive means, means effective at least during the time delay period for decreasing the pressure on the disengaging device and then modulating the pressure as a function of acceleration of the driving member to permit limited positive acceleration of the driving member, and including means for gradually removing the pressure on the disengaging device when the engaging device assumes control of the driving member acceleration, means effective after the initial shift phase actuated by a predetermined positive acceleration of the driving member to rapidly decrease the requested pressure on the engaging device as a function of the driving member acceleration to establish the approximate pressure required to achieve the programmed positive acceleration, and means for varying the pressure on one of the devices as a function of the difference between the programmed acceleration and the actual acceleration to accurately regulate the acceleration of the driving member to the programmed acceleration.

8. In a multi-ratio transmission having a driving input member, a pair of selectively engageable torque transmitting friction devices, and hydraulic pressure responsive means for engaging one of the devices and disengaging the other of the devices for effecting a ratio change, electronic control means regulating the pressure responsive means during engagement and disengagement of the torque transmitting devices for establishing an acceleration of the driving member according to a programmed acceleration, the control means including sensor means for electrically determining the acceleration of the driving input member, command means for producing a command signal requesting a ratio change, electronic programming means responsive to the command signal for producing a programmed desired acceleration signal, means effective during an initial shift phase for requesting a pressure on the engaging device in excess of that required to achieve the programmed desired acceleration, the pressure required to achieve the programmed acceleration being achieved after a time delay period due to slow initial response of the pressure responsive means, means responsive to the sensor means and effective at least during the time delay period for decreasing the pressure on the disengaging device to effect partial disengagement and modulating the pressure as a function of acceleration of the driving member to limit the acceleration of the driving member, means responsive to the sensor means and effective after the initial shift phase actuated by a predetermined acceleration of the driving member to rapidly decrease the requested pressure on the engaging device as a function of the driving member acceleration to establish the approximate pressure required to achieve the programmed acceleration, means responsive to the sensor means and the programming means for comparing the programmed acceleration and the actual acceleration of one of the members and for integrating the difference and varying the pressure on the engaging device according to the integrated difference to accurately regulate the acceleration of the one member to the programmed acceleration, and means for gradually removing the pressure on the disengaging device when the engaging device assumes control of the driving member acceleration.

9. The method of controlling a ratio change in a transmission having a pair of selectively engageable torque transmitting devices having variable torque capacities, and a rotary member which accelerates during a ratio change, wherein a ratio change is effected by engaging one of the devices and disengaging the other of the devices, comprising the steps of producing a command signal for requesting a ratio change, in response to the command signal, programming a desired acceleration of the rotary member, decreasing the torque capacity of the disengaging device to permit slipping of the disengaging device, limiting the amount of slipping to a maximum value by modulating the torque capacity of the disengaging device, establishing a torque capacity value for the engaging device which approximates the value required to achieve the desired acceleration, then controlling the actual acceleration to the desired acceleration by modulating the torque capacity of at least one of the devices as a function of the acceleration of the rotary member.

10. The method of controlling a ratio change in a transmission having a driving input member and a pair of selectively engageable torque transmitting devices having variable torque capacities, wherein a ratio change is effected by engaging one of the devices and disengaging the other of the devices, comprising the steps of producing a command signal for requesting a ratio change, in response to the command signal, programming a desired acceleration of the driving member, decreasing the torque capacity of the disengaging device to permit acceleration of the driving member, limiting the acceleration of the driving member to a maximum value by modulating the torque capacity of the disengaging device, rapidly establishing a torque capacity value for the engaging device by requesting a torque capacity which exceeds the value required to achieve the desired acceleration, decreasing the requested torque capacity of the engaging device to approximate that required to achieve the desired acceleration, then controlling the actual acceleration to the desired acceleration by modulating the torque capacity of at least one of the devices as a function of the acceleration of the driving member.

11. The method of controlling a ratio change in a transmission having a driving input member, a pair of selectively engageable torque transmitting devices, and pressure responsive means for engaging one of the devices and disengaging the other of the devices for effecting a ratio change comprising the steps of sensing acceleration of the driving member, producing a command signal for requesting a ratio change, in response to the command signal, programming a desired acceleration of the driving member, decreasing the pressure on the disengaging device to permit acceleration of the driving member, limiting the acceleration of the driving member to a maximum value by modulating the pressure on the disengaging device as a function of acceleration of the driving member, rapidly establishing a pressure on the engaging device by requesting a pressure exceeding that required to achieve the desired acceleration, rapidly decreasing the requested pressure on the engaging device to approximate that required to achieve the desired acceleration, detecting a predetermined acceleration of the driving member, and in response to the predetermined acceleration, controlling the actual acceleration to the desired acceleration by modulating the pressure of one of the devices as a function of the difference between the desired acceleration and the actual acceleration.

12. The method of controlling an upshift ratio change in a transmission having a driving input member, a pair of selectively engageable torque transmitting devices, and pressure responsive means for engaging one of the devices and disengaging the other of the devices for effecting a ratio change, comprising the steps of sensing speed and acceleration of the driving member, producing a command signal for requesting an upshift ratio change, in response to the command signal and the sensed speed, programming a desired deceleration of the driving member and varying the desired deceleration according to the speed of the driving member, decreasing the pressure on the disengaging device to permit positive acceleration of the driving member, limiting the positive acceleration of the driving member to a maximum value by modulating the pressure on the disengaging device as a function of acceleration of the driving member, rapidly establishing a pressure on the engaging device by requesting a pressure exceeding that required to achieve the desired acceleration, rapidly decreasing the requested pressure on the engaging device to approximate that required to achieve the desired deceleration, comparing the desired deceleration and the actual deceleration of the driving members and integrating the difference, detecting a predetermined deceleration of the driving member, and in response to the predetermined acceleration, controlling the actual deceleration to the desired deceleration by modulating the pressure of the engaging device as a function of the integrated difference.

13. The method of controlling a downshift ratio change in a transmission having a driving input member, a pair of selectively engageable torque transmitting devices, and pressure responsive means for engaging one of the devices and disengaging the other of the devices for effecting a ratio change, comprising the steps of sensing acceleration of the driving member, producing a command signal for requesting a downshift ratio change, in response to the command signal, programming a desired positive acceleration of the driving member, decreasing the pressure on the disengaging device to permit positive acceleration of the driving member, limiting the positive acceleration of the driving member to a maximum value by modulating the pressure on the disengaging device as a function of acceleration of the driving member, rapidly establishing a pressure on the engaging device by requesting a pressure exceeding that required to achieve the desired positive acceleration, rapidly decreasing the requested pressure on the engaging device to approximate that required to achieve the desired positive acceleration, comparing the desired positive acceleration and the actual acceleration of the driving member and integrating the difference, detecting a predetermined positive acceleration of the driving member, and in response to the predetermined acceleration, controlling the actual acceleration to the desired acceleration by modulating the pressure of one of the devices as a function of the integrated difference.

* * * * *

PO-1050
(5/69)

UNITED STATES PATENT OFFICE
CERTIFICATE OF CORRECTION

Patent No. 3,754,482          Dated   August 28, 1973

Inventor(s) Robert K. Sanders, Jerry R. Marlow & Kenneth A. Dornfeld

It is certified that error appears in the above-identified patent and that said Letters Patent are hereby corrected as shown below:

```
Column  6 line 20 change "108" to --180--,
          line 54 change "to" to --in--.
Column  7 line 28 change "between" to --before--.
Column  8 line 45 change "line" to --ratio--,
          line 65 change "270" to --260--.
Column  9 line 26 change "fully" to --full--,
          line 28 change "actiate" to --activate--,
          line 60 change "netural" to --neutral--.
Column 10 line 32 change "potentiameters" to --potentiometers--.
Column 11 line 12 change "lone" to --long--,
          line 55 change "of" to --off--.
Column 12 line 40 change "votlage" to --voltage--.
Column 13 line 26 change "inpu" to --input--.
Column 20 line 17 change "modulation" to --modulated--.
Column 26 line 38 change "the" to --that--.
```

Signed and sealed this 11th day of March 1975.

(SEAL)
Attest:

RUTH C. MASON
Attesting Officer

C. MARSHALL DANN
Commissioner of Patents
and Trademarks